Patented Dec. 16, 1930

1,785,692

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

ANTIOXIDANT OR AGE RESISTER

No Drawing. Original application filed February 7, 1928, Serial No. 252,677. Divided and this application filed February 5, 1929. Serial No. 337,736.

My invention relates to the treatment of rubber and it has particular relation to a method of enhancing the aging properties of that substance.

This application is a division of application Serial No. 252,677, filed February 7, 1928.

More specifically my invention has for its object the provision of a material which, when incorporated into rubber, acts as an antioxidant or age-resister.

Another object of the invention consists in the provision of a material of the above designated class that is composed of an aromatic nitrosamine.

Heretofore, it has been observed that certain amino bodies, when incorporated into rubber compounds, inhibit the oxidation and aging of those materials.

This invention consists in the discovery that aromatic nitrosamine materials may also be employed as antioxidants or age-resisters. These materials may be introduced into the rubber prior to vulcanization without materially accelerating the rate of vulcanization when the rubber compound is subjected to heat. The compounds, therefore, do not disturb the so-called "balance" of the rubber compound. They, therefore, may be introduced into standard formulæ without changing the proportions of accelerators previously employed in the formulæ.

Phenyl-beta-naphthyl nitrosamine is a specific example of a material which falls within the scope of the invention. One method by which this material may be prepared is as follows:

Dissolve one part of phenyl-beta-naphthylamine in four parts of glacial acetic acid and twelve parts of alcohol. This solution should be chilled quickly in an ice bath and 3.25 parts of sodium nitrite, dissolved in a minimum amount of water, should be added thereto. Phenyl-beta-naphthyl nitrosamine separates out sometimes as a solid material, and at other times as an oil which crystallizes after standing. The solid material may be filtered off and purified by recrystallizing it from alcohol or benzene. The purified product consists of a crystalline material having a yellowish color and having a melting point of 97 to 98° C. The crystalline character of the product, together with the definite melting point thereof, is clearly indicative that a true chemical reaction takes place when phenyl-beta-naphthylamine and sodium nitrite are brought together under the conditions described above.

Phenyl-beta-naphthyl nitrosamine may, of course, be employed as an antioxidant or age-resister in various rubber compounds. The following is an example of a compound which insures a product having excellent aging properties:

|   | Parts |
|---|---|
| Extracted rubber | 100 |
| Zinc oxide | 5 |
| Sulphur | 3 |
| Stearic acid | 1.5 |
| Hexamethylene tetramine | 2 |
| Antioxidant | 1 |

Samples of material prepared in accordance with the preceding formula were vulcanized by subjecting them to steam heat at 40 pounds pressure for periods of 30, 50 and 70 minutes, respectively. One set of these samples was subjected to physical tests in order to ascertain their elasticity and tensile strength prior to aging. The results of these tests are indicated in the following table:

| Time of cure Mins. at 40 # | Tensile strength | Percent elong. | Load in kgs/cm² at | |
|---|---|---|---|---|
| | | | 500% elong. | 700% elong. |
| 30 | 90 | 920 | 12 | 30 |
| 50 | 134 | 830 | 20 | 62 |
| 70 | 180 | 790 | 29 | 110 |

A second set of samples was subjected to artificial aging in an oxygen bomb heated to a temperature of 50° C. and to a pressure of 50 pounds per square inch for a period of six days. These samples were weighed both before and after artificial aging in order to ascertain the per cent absorption of oxygen during the test. The samples were also subjected to physical tests similar to those conducted upon the unaged samples. The results of these tests are indicated in the following table:

| Time of cure Mins. at # | Tensile strength | Percent elong. | Load in kgs/cm² at | | Percent weight Increase |
|---|---|---|---|---|---|
| | | | 500% elong. | 700% elong. | |
| 30 | 90 | 875 | 14 | 37 | —0.86 |
| 50 | 156 | 795 | 26 | 89 | — .02 |
| 70 | 185 | .740 | 38 | 150 | — .01 |

It will be observed that the presence of the antioxidant inhibits the absorption of oxygen to a very material degree, even when the samples are exposed to prolonged heating in the bomb. The antioxidant also preserves, to a material extent, the original elasticity and tensile strength of the product. Under similar circumstances samples containing no antioxidant would have been reduced to resinous masses containing twelve per cent or more of oxygen and would be devoid of elasticity or appreciable tensile strength.

My invention is not limited to phenyl-beta-naphthyl nitrosamine, but includes the nitroso derivatives of beta-beta-di-naphthylamine and alpha-beta-di-naphthylamine, as well as other amines of this same class which may be prepared by methods similar to the one employed in the preparation of phenyl-beta-naphthyl nitrosamine. Examples of such methods are disclosed in Berichte 20–2622 or Annalen 243–300.

Although I have described in detail only one embodiment of the invention, it will be apparent to those skilled in the art that it is not so limited but that various minor modifications may be made therein without departing from the spirit of the invention or from the scope of the appended claims.

What I claim is:

1. A method of preserving rubber which comprises incorporating therein a material having the following structural formula:

in which R and R₁ are naphthyl groups.

2. A rubber product that has been vulcanized in the presence of a material having the formula

in which R and R₁ are naphthyl groups.

3. A method of preserving rubber which comprises incorporating therein a dinaphthyl nitrosamine.

4. A rubber product that has been vulcanized in the presence of a dinaphthyl nitrosamine.

5. A method of preserving rubber which comprises vulcanizing it in the presence of a dinaphthyl nitrosamine in which both naphthyl groups are similar.

6. A rubber product that has been vulcanized in the presence of a dinaphthyl nitrosamine in which both naphthyl groups are similar.

7. A method of preserving rubber which comprises incorporating therein a beta-beta-dinaphthyl nitros amine.

8. A rubber product that has been vulcanized in the presence of beta-beta-dinaphthyl nitros amine.

9. A method of preserving rubber which comprises vulcanizing it in the presence of a material selected from a group comprising beta-beta-dinaphthyl nitros amine and alpha-beta-dinaphthyl nitros amine.

10. A rubber product that has been vulcanized in the presence of a material selected from a group comprising beta-beta-dinaphthyl nitros amine and alpha-beta-dinaphthyl nitros amine.

11. A rubber product that has been vulcanized in the presence of a compound having the formula

where R is a beta naphthylene group and R₁ is a material selected from a group comprising α and β naphthylene.

12. An accelerator composition comprising an organic accelerator and a di-naphthyl nitroso amine.

13. An accelerator composition comprising an organic accelerator and di-beta-naphthyl nitroso amine.

In witness whereof, I have hereunto signed my name.

Signed at Akron, in the county of Summit and State of Ohio, U. S. A. this 4th day of February, 1929.

ALBERT M. CLIFFORD.